Oct. 14, 1969 R. TAESLER 3,472,437

GRIPPER FEED MECHANISM FOR CINEMATOGRAPHIC APPARATUS

Filed May 3, 1967 4 Sheets-Sheet 1

Oct. 14, 1969 R. TAESLER 3,472,437

GRIPPER FEED MECHANISM FOR CINEMATOGRAPHIC APPARATUS

Filed May 3, 1967

4 Sheets-Sheet 4

3,472,437

GRIPPER FEED MECHANISM FOR CINEMATOGRAPHIC APPARATUS

Rudolf Taesler, Stuttgart, Germany, assignor to Zeiss Ikon Aktiengesellschaft, Stuttgart, Germany, a corporation of Germany Filed May 3, 1967, Ser. No. 635,745
Claims priority, application Germany, May 7, 1966, Z 12,202
Int. Cl. G03b *1/22*
U.S. Cl. 226—67 7 Claims

ABSTRACT OF THE DISCLOSURE

A film advancing mechanism for a cinematographic apparatus in which a film perforation engaging member is operated by a constant-diameter cam disc fixedly mounted on a drive shaft whose axis of rotation extends perpendicularly through said cam disc at a point which is displaced from the centers of curvature of any of the curved boundary faces forming together the perimeter of said cam disc.

The invention relates to a gripper feed mechanism for cinematographic apparatus provided with a constant-diameter cam disc which serves as the member for operating the gripper.

In conventional gripper feed mechanisms of this kind, the axis of rotation of the drive shaft operating the constant-diameter cam disc extends through the center of curvature of at least one of the boundary surfaces of the constant-diameter cam. This arrangement of the cam disc and the particular shape of the latter account for a gripper movement with rest periods at the ends of the path of travel of the gripping member.

These rest periods occur as long as the frame in which the cam disc operates is in cooperation with one or more of the boundary surfaces of the cam disc in whose centers of curvature the drive shaft is positioned. This means for a Reauleux's spherical triangle that the gripping member is in a rest position when the parallel guide surfaces of the frame engage the corner which coincides with the center axis of the drive shaft and the arc segment of the spherical triangle opposite of said corner or its equidistant line, respectively.

A requisite for this rest position is in practice a satisfactory geometric form of the guide surfaces provided in the gripper frame which are straight lines, as well as of the perimeter of the cam disc which is composed of sections of a circle. If in a gripper feed mechanism in which the rest period coincides at least partially with the exposure time or with the time for projecting a picture these cooperating surfaces deviate from their accurate geometric form, changes in the picture steadiness during exposure or projection, respectively, will occur. Blurred pictures or an unsteady screen picture, respectively, are the result. Spring members to offset differences in the diameter of the cam disc fail to improve the situation in this respect.

To manufacture the constant-diameter cam disc with the required precision is involved and costly. Technologically and economically favorable ways of production, such as making the constant-diameter cam disc from a plastics material, cannot be taken advantage of.

Another shortcoming of conventional grip feed mechanisms is that due to the over-stroke necessary for causing the gripper to enter the film, the gripper on its way back from the point of reversal engages the bar between the perforations in the film with a rather harsh blow which may damage the film. Likewise, film damage may result from pushing just as roughly a film operated gripper, a so-called drag gripper, across the slanted cam face on the back of the gripping tooth from out of a film perforation.

Slightly more satisfactory is another known gripper feed mechanism having a circular eccentric for driving the gripper. However, the feed ratio 1:2 obtained with this eccentric disc is insufficient for small units, particularly pocket-size movie cameras. If in such a small unit the shutter is to be kept open the required period of time, a gripper feed mechanism is necessary which approaches at least approximately a feed ratio of 1:3. Although an eccentric drive comes close to this ratio when operating with an excessive stroke, the aforementioned blow to the perforation bar by the gripping tooth is still too severe and the time of advancing the film remains yet too long.

The invention has as its objects to produce a gripping feed mechanism which is simple in construction, permits to maintain approximately a feed ratio of 1:3, is easy on the film and assures a good picture quality without making excessive and high-cost demands on the manufacturing precision of the member driving the gripping feed mechanism.

In accordance with the invention, the member driving the gripping feed mechanism comprises a constant-diameter cam disc whose drive shaft is displaced from its heretofore customary position in the center of curvature of at least one of the boundary surfaces of the cam disc. In this manner it is possible with unchanged dimensions of the constant-diameter cam disc to vary the movement of the gripping feed mechanism and its stroke and adapt it to the prevailing requirements.

If according to the invention the axis of rotation of the drive shaft is relocated in the basic shape of a constant-diameter cam disc, i.e., a spherical triangle, a shortening of the length of the stroke of the gripping feed mechanism is obtained. Simultaneously, the previous rest period becomes a period of some small motion of the gripper. Immediately upon arriving at the lowermost gripper position, i.e. as soon as the film at the end of the advance stroke has been brought into its proper position, the gripping tooth is disengaged slowly from the perforation edge which it has been engaging so far. Any movements of the gripper caused by a less accurately made cam disc will not affect the film. If the drive shaft is displaced along a symmetry line extending through the center of curvature, for instance through the corner point of the basic shape of a spherical triangle, then the gripper at the beginning and the end of the moving phase which heretofore was a period of rest, briefly reaches its extreme terminal position. The curve of FIG. 1 illustrates this moving phase in principle. The $x$-axis represents the angle of rotation of the drive shaft and the $y$-axis represents the gripper stroke. Therefore, only two points of the circumference of the cam disc have to be coordinated.

The advantage of this solution is that the gripper feed mechanism operates uniformly in both directions of rotation of the cam disc. If a certain direction of rotation is preferred, as in the employment of a drag-gripper advancing only in one direction, then according to the invention it is expedient to displace the drive shaft not along the symmetry line S but along a straight line connecting two centers of curvature of the cam disc of which one is the point of the prior location of the drive shaft. Then the gripper immediately upon arriving at its terminal position slowly reverses its movement and, after the former rest period has lapsed, changes into the rapid feed motion.

This phase of motion is basically represented by the curve shown in FIG. 2. In this case only one point of the circumference of the cam disc needs to be taken into account.

In practice, the film advance by a gripper feed mechanism comprises the following steps of the drag gripper:

(a) The gripper tooth engages the film perforation to be used for the next advancing step, shortly before the upward stroke of the gripper reaches its end;

(b) The gripper tooth is displaced from the perforation hole by the perforation bar which at the over-stroke is engaged by the inclined back face of the tooth, the perforation bar being located above the gripper tooth. The over-stroke has to be of such a length that the gripper tooth up to its tip is lifted out of the perforation so as to prevent a change of direction along with the sudden change of load in this phase of motion.

(c) Upon passing the top dead center the gripper slowly moves downward and the gripper tooth slowly enters the perforation to be used next.

(d) The face of the gripper tooth slowly engages the perforation bar below it and the film advancing phase begins.

(e) Film advancement, gradual tapering out of the forwarding motion and placing of the film in its next exposure position.

(f) Upon arriving at this position immediate reversal of the direction of movement and slowly lifting the gripper tooth out of the perforation hole by the inclined back face of the tooth of the gripper sliding onto the perforation bar located above it.

(g) Change from the slow motion to a rapid return movement upon reaching the perforation edge by the tip of the tooth of the gripper, when the direction of movement changes from the upward slanting direction during the disengagement from the perforation to a vertical return movement.

Similarly positive results are obtained when in accordance with the invention the axis of rotation of the drive shaft is placed outside of the basic shape of the constant-diameter cam disc, i.e. of the Reauleux's spherical triangle.

Generally speaking, the result is an extended length of the gripper stroke when the dimensions of the constant-diameter cam disc remain unchanged.

When the axis of rotation of the drive shaft is displaced along the symmetry line S passing through the center of curvature A which was the original point of placement of the axis of rotation of the drive shaft, then a device is obtained which seizes and releases the film slowly and in general handles it especially gently. The attainable feed ratio for the film depending upon the dimensions is about 1:2.5.

A lateral displacement from the symmetry line S results in a long gripper stroke and a motion which is substantially represented by the curve shown in FIG. 2.

In a further development of the invention, preferred lines for the displacement of the axis of rotation of the drive shaft are also the straight connecting lines between two centers of curvature of the triangular cam disc of which one center of curvature is the conventional point of placing the axis of rotation of the drive shaft, and a straight line perpendicularly intersecting the symmetry line S in that center of curvature of the cam disc through which the axis S is extending.

This arrangement is favorable because the resulting course of motion does not produce a change of direction within the period of slow motion in the proximity of the points of reversal.

The invention will be described in further detail with reference to the accompanying drawings from which details non-essential to the invention have been omitted.

Figures 3, 4:
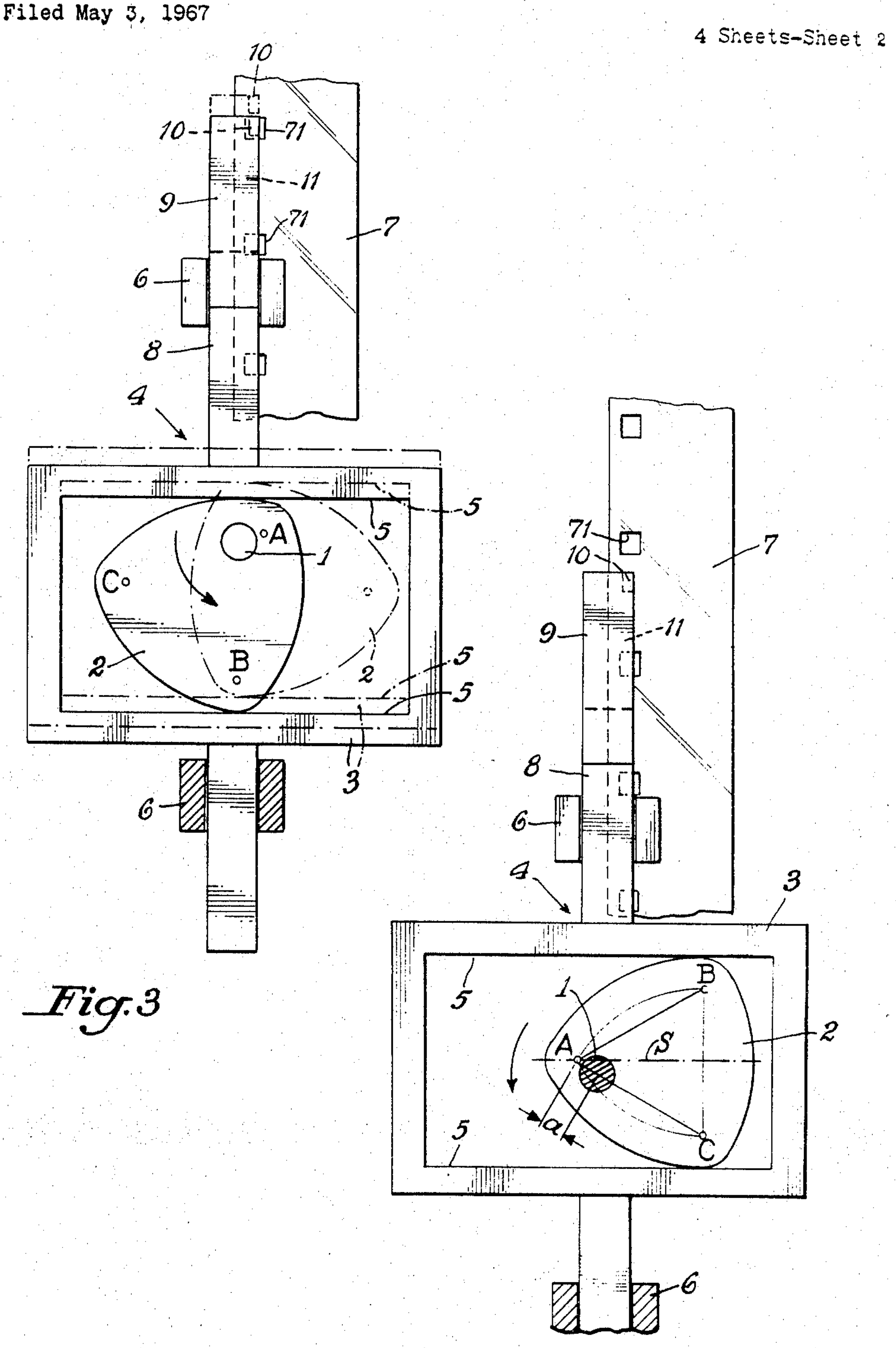
FIG. 3 is a side elevation view of a gripper feed mechanism in a simplified illustration in two different phases of motion.
FIG. 4 is a side elevation view of the gripper feed mechanism of FIG. 3 shown in an intermediate position.

Referring to the FIGS. 3 and 4, a cam disc 2 in the form of an equiangular spherical triangle with corners or centers of curvature A, B and C, respectively, is supported by a drive shaft 1 which at the same time acts also as the shaft for the shutter mechanism of the apparatus (FIG. 4). With S is designated the symmetry line of the spherical triangle which extends through point A of it. The drive shaft 1 is displaced from the center of curvature A and is moved a distance *a* along the line $\overline{AC}$ in the direction toward C.

The rectangular frame 3 of a gripping feed mechanism 4 encases the cam disc 2 so that its two spaced parallel horizontal guide edges 5 are always tangent to two opposite points of the perimeter of the cam disc 2. The gripper mechanism 4 is movably guided in vertical direction by guide rails 6 along the vertical path of the film 7. The upper guided portion 8 of the gripper mechanism 4 carries a gripping member 9 which is resiliently mounted perpendicularly to the plane of the drawing and has a gripping tooth 10 the movement of which is perpendicular to the film 7 and is controlled by that film 7 (drag gripper).

The position of the gripper feed mechanism 4 indicated in FIG. 3 by solid lines constitutes the lowermost gripping position. In this position the film 7 remains at rest or is stationary until the beginning of the next advancement step. The position of the gripper feed mechanism 4 and the cam disc 2 indicated in FIG. 3 in dash and dotted lines is the position in which the slow gripper motion extending over about 120° of the rotation of the cam disc for disengaging the gripper tooth 10 from a film perforation 71 of the film 7 is terminated and the rapid reverse motion of the gripper 4 begins.

In the position illustrated in FIG. 4 one half of the travelling distance of the gripper feed mechanism has been covered.

Figure 5:
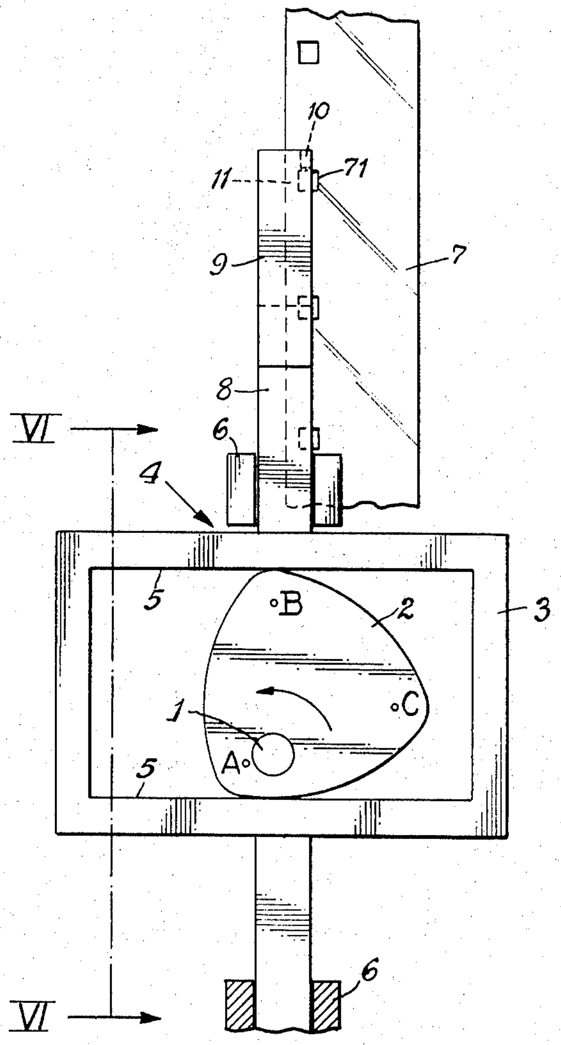
FIG. 5 is a side elevation view of the gripper feed mechanism of FIG. 3 with the gripping member shown in its uppermost end position.
Figure 6:
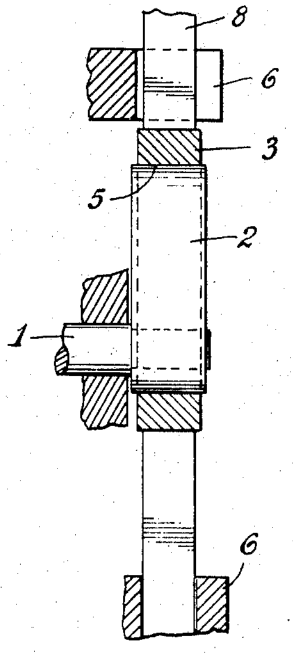
FIG. 6 is a vertical sectional view along the line VI—VI of FIG. 5.

FIG. 5 illustrates the gripping member 9 in its highest position just before the beginning of the movement of the gripping tooth 10 for engaging a perforation 71 of the film 7 now in front of it. With the same slow motion as is indicated in FIG. 3 by the two phases of movement, the gripping tooth 10 engages with its front face the perforation bar 11 which lies below it. With the start of the accelerated downward movement of the gripper feed mechanism 4 the advancement of the film also starts and these two coactions continue until the gripper feed mechanism 4 is back in the position indicated by solid lines in FIG. 3.

Figure 1:
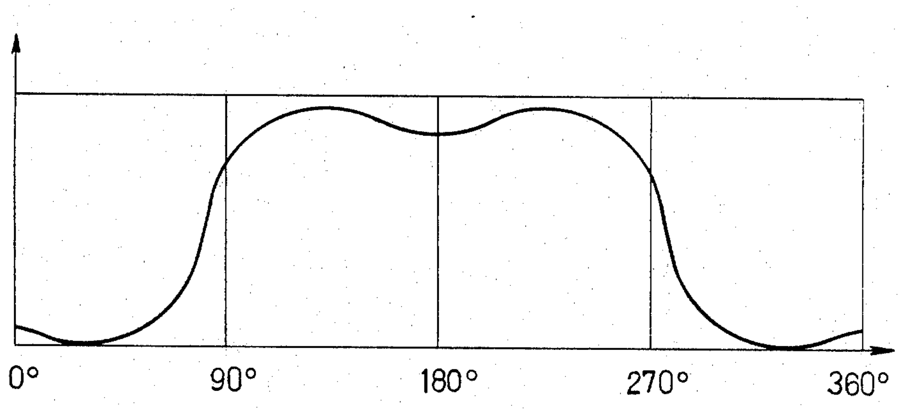
FIG. 1 is a curve representing the course of motion when the axis of rotation of the drive shaft is displaced along the symmetry line S within a spherical triangle.
Figure 2:
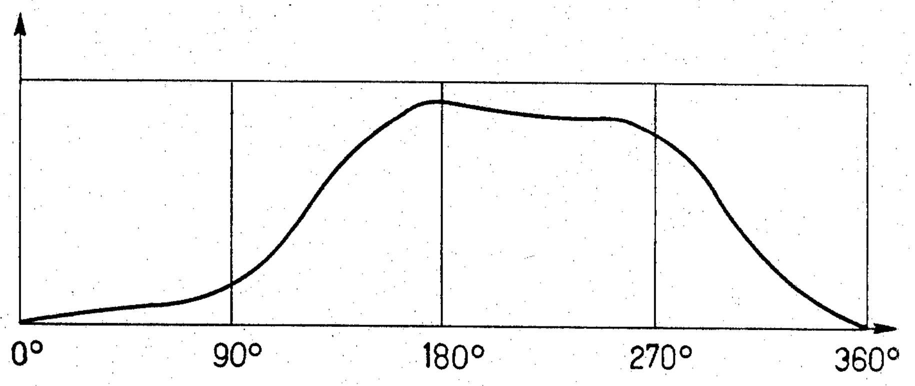
FIG. 2 is a curve representing the course of motion when the axis of rotation of the drive shaft is displaced along a connecting straight line between two centers of curvature of a spherical triangle and remaining within the spherical triangle, one of said centers of curvature being the conventional point of placement of the axis of rotation of the drive shaft.

This phase of motion is also represented by the curve of FIG. 2.

Figure 7:
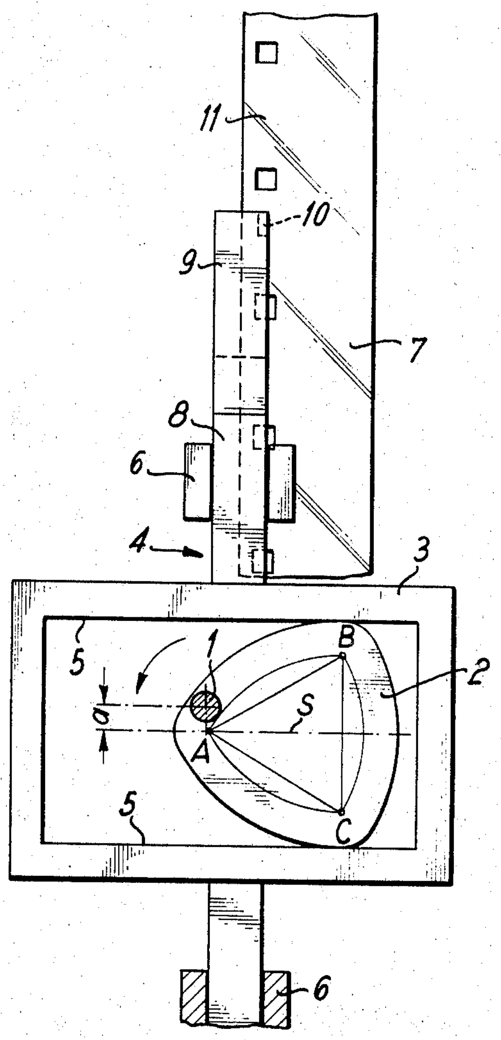
FIG. 7 illustrates in side elevation a modified gripper feed mechanism.

According to FIG. 7, the drive shaft 1' which has been displaced a distance *a'* along a line which extends perpendicularly to the symmetry line S of the spherical triangle which extends through point A of it and therefore the axis of the shaft 1' comes to lie outside of the spherical triangle ABC forming the basic perimeter of the constant diameter cam disc 2.

What I claim is:

1. A gripper feed mechanism for cinematographic apparatus, comprising a gripping member, a single constant-diameter cam disc in the form of an equiangular spherical triangle for operating said gripping member, a drive shaft on which said cam disc is fixedly mounted, the axis of rotation of said drive shaft extending through said cam disc at a point which is displaced from the center of curvature of one of the curved boundary faces of said constant-diameter cam disc, said displacement of said axis of rotation of said drive shaft being such a distance than the rest period during the movement of said gripping member in the film advancing direction becomes a period of minor movement of said gripping member during which the gripping member after reaching its end position is moved immediately away from it.

2. A gripper feed mechanism according to claim 1, in which said drive shaft is disposed inside and spaced from the basic perimeter of said constant-diameter cam disc comprising an equiangular spherical triangle.

3. A gripper feed mechanism according to claim 1, in which the axis of rotation of said drive shaft is arranged outside of the basic perimeter of said constant-diameter cam disc formed by an equiangular spherical triangle.

4. A gripper feed mechanism according to claim 1, in which said drive shaft is displaced along a symmetry line extending through a center of curvature of one corner of said single constant-diameter cam disc formed by an equiangular spherical triangle.

5. A gripper feed mechanism according to claim 1, in which said drive shaft is displaced along a straight line connecting two centers of curvature of said constant-diameter cam disc formed by an equiangular spherical triangle.

6. A gripper feed mechanism according to claim 1, in which the axis of rotation of said drive shaft is displaced along a straight line which extends through a center of curvature at one corner of said constant-diameter cam disc formed by an equiangular spherical triangle and intersects at a right angle a symmetry line of said cam disc extending through said center of curvature.

7. A gripper feed mechanism according to claim 1, including film actuated means for controlling the movement of said gripping member perpendicularly to the plane of the film in such a manner that the distance of displacement of the axis of the drive shaft is so selected that the ranges of the gripper movement at the ends of the gripper path, corresponding to the rest periods when the drive shaft is disposed in the center of curvature of said path, in relation to the film feed movement of lower speed are effective over a gripper path which is equal to the length of the perforation in the film measured in the longitudinal direction of the film.

References Cited

UNITED STATES PATENTS

| | | | |
|---|---|---|---|
| 1,542,409 | 6/1925 | Readeker | 352—194 |
| 2,288,148 | 6/1942 | Sperry | 226—67 |

FOREIGN PATENTS

| | | |
|---|---|---|
| 1,131,088 | 6/1962 | Germany. |

ALLEN N. KNOWLES, Primary Examiner